United States Patent
Hara

(10) Patent No.: US 11,378,768 B2
(45) Date of Patent: Jul. 5, 2022

(54) FOCUS CONTROL DEVICE, FOCUS CONTROL METHOD, AND IMAGING DEVICE

(71) Applicant: SONY CORPORATION, Tokyo (JP)

(72) Inventor: Yuki Hara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 168 days.

(21) Appl. No.: 16/617,145

(22) PCT Filed: Apr. 12, 2018

(86) PCT No.: PCT/JP2018/015376
§ 371 (c)(1),
(2) Date: Nov. 26, 2019

(87) PCT Pub. No.: WO2018/221034
PCT Pub. Date: Dec. 6, 2018

(65) Prior Publication Data
US 2021/0149148 A1    May 20, 2021

(30) Foreign Application Priority Data

Jun. 2, 2017 (JP) .............................. JP2017-109941

(51) Int. Cl.
*G02B 7/02* (2021.01)
*G02B 7/28* (2021.01)
(Continued)

(52) U.S. Cl.
CPC .............. *G02B 7/028* (2013.01); *G02B 7/28* (2013.01); *G02B 15/14* (2013.01); *G03B 13/36* (2013.01)

(58) Field of Classification Search
CPC .......... G02B 7/028; G02B 7/28; G02B 15/14; G02B 27/28; G02B 7/08; G03B 13/36; H04N 5/232
See application file for complete search history.

(56) References Cited

U.S. PATENT DOCUMENTS 4,602,861 A * 7/1986 Taniguchi ................ G02B 7/36
                                                          396/106
5,227,832 A * 7/1993 Kawasaki .............. G02B 7/282
                                                          396/213
(Continued)

FOREIGN PATENT DOCUMENTS

JP        06-86183 A    3/1994
JP        06-086183 A   3/1994
(Continued)

OTHER PUBLICATIONS

International Search Report and Written Opinion of PCT Application No. PCT/JP2018/015376, dated Jul. 17, 2018, 09 pages of ISRWO.

(Continued)

*Primary Examiner* — Robert E. Tallman
(74) *Attorney, Agent, or Firm* — Chip Law Group

(57) ABSTRACT

A temperature detection section detects the temperature of an imaging lens. A control section sets a focal point change correction amount for a distance from the imaging lens to an imaging surface of an imaging element, on the basis of the temperature at the time of focusing and the current temperature that are detected by the temperature detection section, and a signal reading range according to an imaging mode on the imaging surface of the imaging element where a subject optical image is formed by the imaging lens. A distance adjustment section performs an adjustment according to the focal point change correction amount set by the control section, on the distance from the imaging lens to the imaging surface at the time of focusing. Obtain a picked-up image restrained from being lowered in resolution, irrespectively of the temperature change of the imaging lens or switching of the imaging mode.

13 Claims, 7 Drawing Sheets

(51) Int. Cl.
*G02B 15/14* (2006.01)
*G03B 13/36* (2021.01)

(56) References Cited

U.S. PATENT DOCUMENTS

2009/0168199 A1* 7/2009 Ishikawa ............... G02B 7/028
359/696
2017/0366740 A1 12/2017 Nakamaru et al.

FOREIGN PATENT DOCUMENTS

| JP | 11-205655 A | 7/1999 |
| JP | 2003-222787 A | 8/2003 |
| JP | 2006-071741 A | 3/2006 |
| JP | 2008-203515 A | 9/2008 |
| JP | 2014-202922 A | 10/2014 |
| WO | 2016/158040 A1 | 10/2016 |

OTHER PUBLICATIONS

Office Action for JP Patent Application No. 2019-522009, dated Jan. 11, 2022, 06 pages of English Translation and 06 pages of Office Action.

* cited by examiner

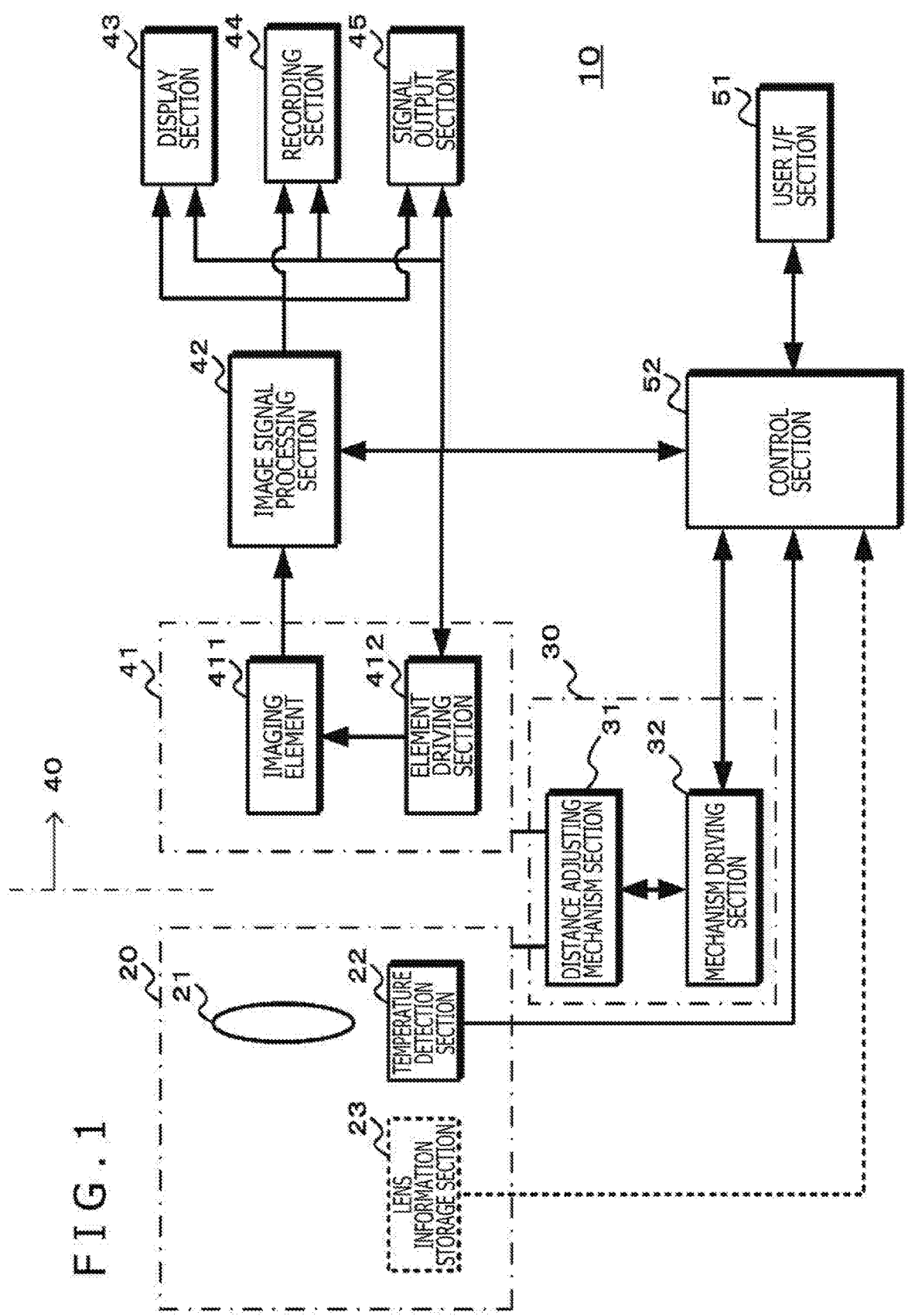

FIG. 5

| TEMPERATURE | SIGNAL READING RANGE | | |
|---|---|---|---|
| | TELEPHOTO IMAGING MODE (ARa≦30%) | NORMAL IMAGING MODE (30%<ARb≦50%) | WIDE-ANGLE IMAGING MODE (50%<ARc) |
| −10°C | −15 μm | −13 μm | −10 μm |
| 0°C | −10 μm | −5 μm | 0 μm |
| 10°C | −5 μm | +3 μm | +10 μm |
| 20°C | 0 μm | +10 μm | +20 μm |
| 30°C | +5 μm | +17 μm | +30 μm |
| 40°C | +10 μm | +25 μm | +40 μm |
| 50°C | +15 μm | +33 μm | +50 μm |
| 60°C | +20 μm | +45 μm | +60 μm |

| TEMPERATURE | SIGNAL READING RANGE | |
|---|---|---|
| | WIDE-ANGLE IMAGING MODE (50%<ARc) | PARTIAL IMAGING MODE (ARd) |
| -10°C | -10 μm | -5 μm |
| 0°C | 0 μm | +5 μm |
| 10°C | +10 μm | +15 μm |
| 20°C | +20 μm | +25 μm |
| 30°C | +30 μm | +35 μm |
| 40°C | +40 μm | +45 μm |
| 50°C | +50 μm | +55 μm |
| 60°C | +60 μm | +65 μm |

FOCUS CONTROL DEVICE, FOCUS CONTROL METHOD, AND IMAGING DEVICE

CROSS REFERENCE TO RELATED APPLICATIONS

This application is a U.S. National Phase of International Patent Application No. PCT/JP2018/015376 filed on Apr. 12, 2018, which claims priority benefit of Japanese Patent Application No. JP 2017-109941 filed in the Japan Patent Office on Jun. 2, 2017. Each of the above-referenced applications is hereby incorporated herein by reference in its entirety.

TECHNICAL FIELD

The present technology relates to a focus control device, a focus control method, a program and an imaging device, and is to make it possible to obtain a picked-up image of good resolution irrespectively of temperature change or the like.

BACKGROUND ART

In the past, a focus control has been conducted such that resolution of a picked-up image would not be lowered even if a temperature change is generated due to a change in environmental temperature or self-heating or the like. For example, in PTL 1, a lens position and an ambient temperature when a predetermined subject is imaged are stored, and the lens position stored is corrected on the basis of a difference between the stored ambient temperature and the current temperature, such that a lowering in resolution (out-of-focus) would not be generated due to the temperature change.

CITATION LIST

Patent Literature

[PTL 1]
JP H11-205655A

SUMMARY

Technical Problem

Incidentally, when not only a focal distance of an imaging lens is changed due to temperature but also field curvature is generated, the picked-up image may be an image lowered in resolution due to the field curvature, even if the lens position is corrected according to the temperature change.

In view of this, it is an object of the present technology to provide a focus control device, a focus control method, a program and an imaging device by which a picked-up image of good resolution can be obtained irrespectively of temperature change or the like.

Solution to Problem

According to a first aspect of the present technology, there is provided a focus control device including a control section controlling a focal point change correction amount for a distance from an imaging lens to an imaging surface, on the basis of temperature change of the imaging lens and an imaging surface range in which a subject optical image is formed by the imaging lens.

In the present technology, the control section, for example, sets an imaging surface range in which a subject optical image is formed by the imaging lens according to an imaging mode, and for example, sets a difference between a focal distance at a temperature of the imaging lens and in the imaging surface range at a focusing time and a focal distance at a temperature of the imaging lens and in the imaging surface range at a current time, as the focal point change correction amount.

In a case where a distance from a center to an end portion of the imaging surface range is greater than a predetermined distance, the control section sets the focal point change correction amount is set by using a position at which a difference in resolution within the imaging surface range is equal to or less than a predetermined amount as a focusing position, and in a case where a distance from a center to an end portion of the imaging surface range is equal to or less than a predetermined distance, the control section sets the focal point change correction amount by using the center of the imaging surface range as a focusing position. In addition, in a case where an optical axis position of the imaging lens is not present at a central portion of the imaging surface range, the control section sets the focal point change correction amount by using a position at which a difference in resolution within the imaging surface range is equal to or less than a predetermined amount as a focusing position.

The control section preliminarily stores, for example, correction tables indicating a distance correction amount for the temperature of the imaging lens, on an imaging surface range basis, and sets the focal point change correction amount by calculating the difference between the distance correction amount for the temperature of the imaging lens at a focusing time and the distance correction amount for the temperature at the current time, by using the correction table corresponding to the imaging surface range. A focal distance for a focusing position when the imaging lens is a predetermined temperature in a predetermined imaging surface range is used as a reference focal distance, and the difference between the reference focal distance and the focal distance at the temperature of the imaging lens is set as the distance correction amount on an imaging surface range basis.

In addition, the control section acquires lens information from the imaging lens, and sets the focal point change correction amount by using the correction table according to the lens information. For example, the control section sets the focal point change correction amount by using the correction table corresponding to identification information indicated by the lens information. Besides, the control section may set the focal point change correction amount by using the correction table corresponding to a field curvature characteristic division indicated by the lens information.

According to a second aspect of the present technology, there is provided a focus control method including: acquiring temperature of an imaging lens; and controlling a focal point change correction amount for a distance from the imaging lens to an imaging surface, on the basis of temperature change of the imaging lens and an imaging surface range in which a subject optical image is formed by the imaging lens.

According to a third aspect of the present technology, there is provided a program for causing a computer to carry out a focus control, the program including: a procedure of acquiring temperature of an imaging lens from a temperature detection section; and a procedure of controlling a focal point change correction amount for a distance from the imaging lens to an imaging surface, on the basis of temperature change of the imaging lens and an imaging surface range in which a subject optical image is formed by the imaging lens.

Note that the program of the present technology is, for example, a program which can be provided in a computer-readable form for a general-purpose computer capable of executing various program codes by a storage medium or a communication medium, for example, a storage medium such as an optical disc, a magnetic disc, or a semiconductor memory, or a communication medium such as a network. By providing such a program in a computer-readable form, processing according to the program is realized on the computer.

According to a fourth aspect of the present technology, there is provided an imaging device including: a temperature detection section detecting temperature of an imaging lens; a control section controlling a focal point change correction amount for a distance from the imaging lens to an imaging surface, on the basis of temperature change of the imaging lens and an imaging surface range in which a subject optical image is formed by the imaging leans; and a distance adjustment section performing distance adjustment of the focal point change correction amount set by the control section on the distance from the imaging lens to the imaging surface.

Advantageous Effect of Invention

In accordance with the present technology, a focal point change correction amount for a distance from an imaging lens to an imaging surface is set based on temperature change of the imaging lens and an imaging surface range in which a subject optical image is formed by the imaging lens. Therefore, by adjusting the distance from the imaging lens to the imaging surface on the basis of the focal point change correction amount, it is possible to obtain a picked-up image of good resolution irrespectively of temperature change or the like. Note that the effects described herein are merely illustrative and are not limitative, and additional effect may exist.

BRIEF DESCRIPTION OF DRAWINGS

FIG. 1 is a diagram illustrating a configuration of an imaging device.

FIG. 5 is a figure illustrating a correction table.

DESCRIPTION OF EMBODIMENT

Figures 2A, 2B:
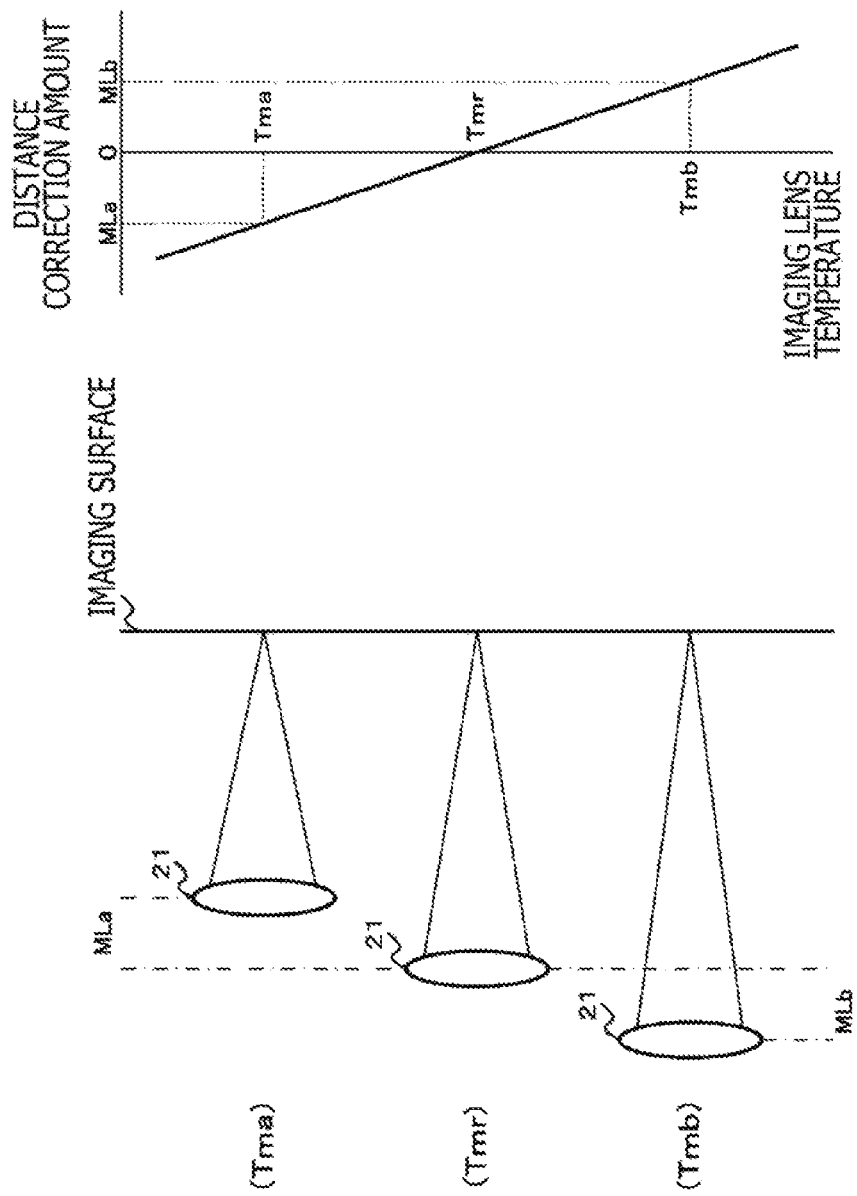
FIGS. 2A and 2B are diagrams illustrating a case where an image surface of an imaging lens is flat and a focal distance of the imaging lens varies with temperature.

A mode for carrying out the present technology will be described below. Note that the description will be made in the following order.

1. Configuration of Imaging Device
2. In Regard of Correction Amount
3. Operation of Imaging Device
4. Other Operations of Imaging Device <1. Configuration of Imaging Device>

FIG. 1 illustrates the configuration of an imaging device using the present technology. The imaging device 10 includes an imaging lens section 20 and a main body section 40. Note that the imaging lens section 20 may be detachably attached, or may be non-detachably attached, to the main body section 40.

The imaging lens section 20 includes an imaging lens 21 and a temperature detection section 22 that detects the temperature of the imaging lens 21. Further, in a case where the imaging lens section 20 is detachably attached to the main body section 40, the imaging lens section 20 includes, for example, lens information storage section 23 in which lens information is stored. The lens information is information that includes any one of identification information regarding the imaging lens section 20, a field curvature characteristic division or field curvature characteristic of the imaging lens 21, or the like.

The imaging lens 21 forms a subject optical image on an imaging surface of an imaging element 411 in the main body section 40. The temperature detection section 22 detects the temperature of the imaging lens 21 (or a position in the vicinity of the imaging lens 21), and outputs a temperature detection signal indicative of the detected temperature to the main body section 40. The lens information storage section 23 outputs lens information to the main body section 40, according to a request from the main body section 40 or when an operation of the main body section 40 is started.

The imaging lens section 20 or the main body section 40 includes a distance adjustment section 30 for adjusting a distance from the imaging lens 21 to an imaging surface of the imaging element in the main body section 40 which will be described later. The distance adjustment section 30 includes a distance adjusting mechanism 31 that moves the imaging lens 21 or the imaging surface in an optical axis direction of the imaging lens 21, and a mechanism driving section 32 that drives the distance adjusting mechanism 31. The mechanism driving section 32 drives the distance adjusting mechanism 31 on the basis of a control signal supplied from a control section 52 of the main body section 40, to adjust the distance from the imaging lens 21 to the imaging surface. In addition, the distance adjustment section 30 may generate distance information indicative of the distance from the imaging lens 21 to the imaging surface, and may outputs the distance information to the control section 52.

The main body section 40 includes an imaging section 41, an image signal processing section 42, a user interface section 51, and the control section 52. Besides, the main body section 40 may include a display section 43, a recording section 44, a signal output section 45, and the like.

The imaging section 41 includes the imaging element 411 such as a CMOS (Complementary Metal Oxide Semiconductor) or a CCD (Charge Coupled Device), and an element driving section 412 that drives the imaging element 411. The imaging element 411 generates an image signal according to the subject optical image in an imaging surface range, or a signal reading range, on the basis of a driving signal supplied from the element driving section 412, and outputs the image signal to the image signal processing section 42.

The image signal processing section 42 performs signal processing on the image signal generated by the imaging section 41, to generate an image signal to be used for display or recording, or output to an external apparatus. The signal processing section 42 performs, for example, noise removing processing, gain adjusting processing, analog-to-digital conversion processing, defective image correction, or the like on the image signal generated by the imaging section 41. In addition, in a case where a mosaic color filter or the like, for example, is used in the imaging section 41 and an image signal such that one pixel indicates one color component of three primary color components is generated, the image signal processing section 42 performs mosaic processing to generate, for example, a three primary color image signal such that one pixel indicates each color component. In addition, the image signal processing section 42 may perform color reproduction processing such as, for example, white balance adjustment, linear matrix conversion, and gamma correction, on the image signal. Besides, the image signal processing section 42 may perform resolution conversion such as to conform the resolution of the image signal having undergone the color reproduction processing or the like to the resolution at the display section 43 that displays a camera-through image or the like. Further, the image signal processing section 42 may perform color space conversion or the like such as to convert into a color space of an image signal to be recorded on a recording medium by the recording section 44 or to be outputted from the signal output section 45 to an external apparatus, on the image signal having undergone the color reproduction processing or the like. In addition, the image signal processing section 42 may perform encoding processing of an image signal or decoding processing of an encoded signal.

The display section 43 is configured using a display element such as a liquid crystal display element and an organic EL display element. Based on the image signal supplied from the image signal processing section 42, the display section 43 displays a picked-up image acquired by the imaging section 41 or a picked-up image recorded on the recording medium of the recording section 44. Besides, the display section 43 displays various kinds of setting screens, various kinds of information and the like concerning functions, operations, etc., of the imaging device 10.

The recording section 44 is provided in such a manner that a recording medium can be fixed or detachably attached. The recording section 44 records an image signal or encoded signal of the picked-up image generated by the main body section 40. In addition, the recording section 44 reads out the image signal or encoded signal recorded on the recording medium, and outputs the read signal to the image signal processing section 42. The signal output section 45 outputs the image signal outputted from the image signal processing section 42 to an external apparatus through a transmission line.

The user interface section 51 includes operation switches, operation buttons, operation dials, a remote control signal reception section, and the like, generates an operation signal according to the user's operation, and outputs the operation signal to the control section 52.

The control section 52 includes a CPU (Central Processing Unit), a ROM (Read Only Memory), a RAM (Random Access Memory), and the like. The ROM (Read Only Memory) stores various programs to be executed by the CPU (Central Processing Unit). The RAM (Random Access Memory) stores such information as various parameters. The CPU executes various programs stored in the ROM, and on the basis of the operation signals from the user interface section 51, controls the sections such that an operation according to the user's operation is performed by the imaging device 10. For instance, according to an imaging mode designated by a user's operation, the control section 52 controls an operation of the element driving section 412 in the imaging section 41, to perform setting of the signal reading range of the imaging element 411, and the like.

In addition, the control section 52 has a function as a focus control device of the present technology. The control section 52 controls a focal point change correction amount for the distance from the imaging lens 21 to the imaging surface of the imaging element 411, on the basis of temperature change of the imaging lens 21 and an imaging surface range of the imaging element 411 in which a subject optical image is formed by the imaging lens 21. The control section 52 preliminarily stores correction tables on an imaging surface range basis, for example, on a signal reading range basis. The control section 52, using a correction table corresponding to the signal reading range in an imaging mode designated by a user's operation or the like, sets a focal point change correction amount for the distance from the imaging lens to the imaging surface of the imaging element at the time of focusing, for example. Note that details of the correction amount will be described later. The control section 52 outputs a control signal according to the focal point change correction amount thus set to the distance adjustment section 30, thereby to perform a distance adjustment of the focal point change correction amount for the distance from the imaging lens 21 to the imaging surface of the imaging element 411 at the time of focusing, such as to make it possible to acquire a picked-up image restrained from being lowered in resolution even when temperature change of the imaging lens 21 or switching of the imaging mode is generated. Note that, in a case where distance information indicative of the distance from the imaging lens 21 to the imaging surface of the imaging element is supplied from the mechanism driving section 32, whether or not an adjustment of the set focal point change correction amount has been conducted can be confirmed by the distance information. In addition, in a case where the distance from the imaging lens 21 to the imaging surface of the imaging element 411 can be changed by a manual operation, the control section 52 can determine whether or not the manual operation for changing the distance has been conducted, by the distance information.

<2. In Regard of Correction Amount>

The correction amount will be next described below. FIGS. 2A and 2B illustrate a case where the image surface of the imaging lens is flat and the focal distance varies with temperature. It is assumed, for example, as illustrated in FIG. 2A, the focal distance at a predetermined temperature Tmr is fr, the focal distance at a temperature Tma lower than the predetermined temperature Tmr is fa, and the focal distance at a temperature Tmb higher than the predetermined temperature Tmr is fb. In this case, as depicted in FIG. 2B, where the distance from the imaging lens to the imaging surface is adjusted by a distance correction amount according to the temperature of the imaging lens 21, it is thereby possible to obtain a picked-up image high in resolution even if a temperature change of the imaging lens 21 is generated.

Figure 3A:
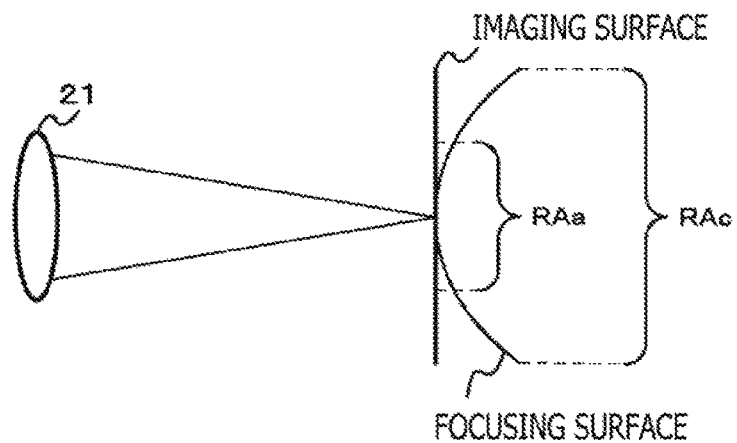
FIGS. 3A, 3B, and 3C are diagrams illustrating a case where a field curvature is generated in the imaging lens.
Figure 3B:
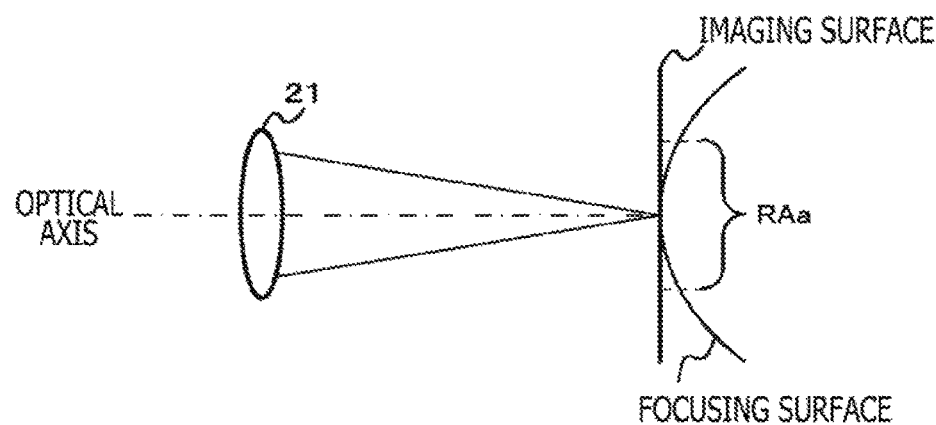
Figure 3C:
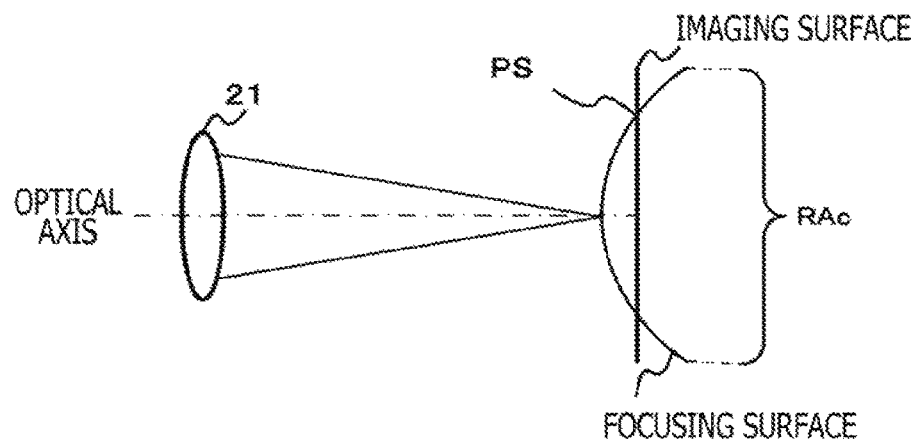
Figure 4:
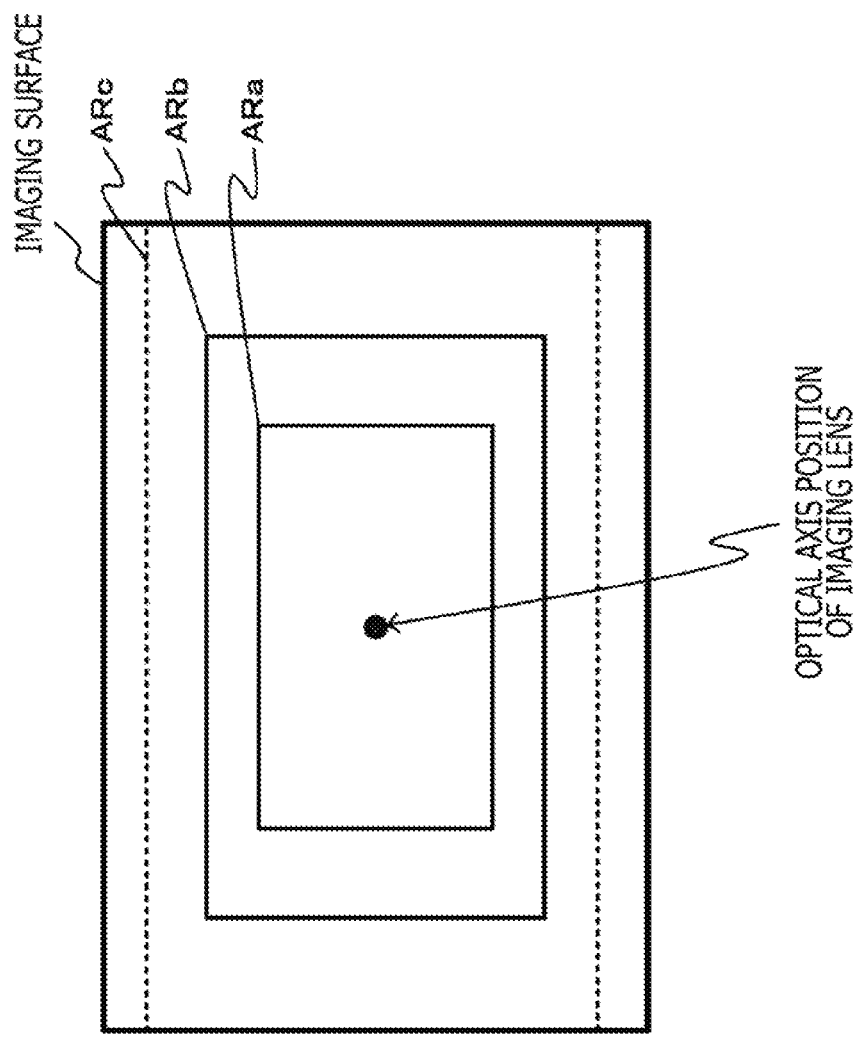
FIG. 4 is a diagram illustrating signal reading ranges on the imaging mode basis.

However, if the image surface of the imaging lens is curved and if the focal distance and the field curvature vary with temperature, a case where a picked-up image high in resolution cannot be obtained even by adjustment of the distance from the imaging lens to the imaging surface according to the temperature of the imaging lens 21 may be generated, depending on the size of the signal reading range. FIGS. 3A, 3B, and 3C illustrate a case where field curvature is generated in the imaging lens. Besides, FIG. 4 illustrates signal reading ranges on an imaging mode basis. The signal reading range (corresponding to the imaging range) is set, for example, such that an optical axis position of the imaging lens as a reference is located at a central portion of the signal reading range. In addition, a region ARa which is the signal reading range in a telephoto imaging mode is set to, for example, equal to or less than 30% of the imaging surface. Besides, a region ARb which is the signal reading range in a normal imaging mode is set to, for example, a range from more than 30% to 50% or less of the imaging surface, and a region ARc which is the signal reading range in a wide-angle imaging mode is, for example, more than 50% of the imaging surface.

Illustrated in FIG. 3A is a case where focus adjustment is performed such that focusing at an optical axis position is achieved, both in a telephoto imaging mode in which the signal reading range is the region ARa and in a wide-angle imaging mode in which the signal reading range is the region ARc wider than the region ARa. In this case, the signal reading range in the telephoto imaging mode has a short distance from the optical axis position to an end portion, so that a picked-up image high in resolution can be acquired. However, since the signal reading range in the wide-angle imaging mode has a long distance from the optical axis position to an end portion, the picked-up image obtained shows a conspicuous lowering in resolution in a peripheral portion even though a central portion is high in resolution.

Therefore, a focusing position is set according to the signal reading range. FIGS. 3B and 3C, there are illustrated focusing positions according to the signal reading ranges. In the case of the telephoto imaging mode in which the signal reading range is the region ARa, the distance from the optical axis position to an end portion of the signal reading range is short. Therefore, as depicted in FIG. 3B, the optical axis position is made to be the focusing position. Besides, in the case of the wide-angle imaging mode in which the signal reading range is the region ARc, the distance from the optical axis position to an end portion of the signal reading range is long. Therefore, as illustrated in FIG. 3C, a position PS at which the difference in resolution within a picked-up image is equal to or less than a predetermined amount is made to be the focusing position, such as to make it possible to obtain a picked-up image which is high in resolution and in which the difference in resolution within the picked-up image is equal to or less than the predetermined amount.

A correction table indicates as distance correction amounts the differences between a reference focal distance and a focal distance at the temperature of the imaging lens on a signal reading range basis, the reference focal distance being the focal distance for a focusing position when the imaging lens 21 is at a predetermined temperature and in a predetermined signal reading range.

FIG. 5 illustrates a correction table, and in the correction table, the distance between the imaging lens 21 and the imaging surface of the imaging element 411 in a case where focusing at the focusing position (the optical axis position of the imaging surface) when the temperature of the imaging lens 21 is 20 degrees and the signal reading range is the region ARa in the telephoto mode is achieved is set as a reference focal distance.

In addition, the correction table depicted in FIG. 5 indicates distance correction amounts at an interval of 10 degrees in a temperature range from −10 degrees to 60 degrees. Besides, the distance correction amounts for the temperatures of the imaging lens are provided for each of the telephoto imaging mode, the normal imaging mode and the wide-angle imaging mode. The signal reading regions on the imaging mode basis are, for example, the regions depicted in FIG. 4. Specifically, the region ARa which is the signal reading range in the telephoto imaging mode is, for example, equal to or less than 30% of the imaging surface. In addition, the region ARb which is the signal reading range in the normal imaging mode is, for example, a range from more than 30% to 50% or less of the imaging surface, and the region ARc which is the signal reading range in the wide-angle imaging mode is, for example, more than 50% of the imaging surface.

In a case where the imaging mode is the telephoto mode (the signal reading range is the region ARa), the distance correction amounts are set in such a manner that focusing at the focusing position is ensured, even when the temperature of the imaging lens is varied. For example, in a case where the temperature of the imaging lens is 30 degrees, focusing at the focusing position is ensured by adjusting the distance between the imaging lens 21 and the imaging surface of the imaging element 411 by [distance correction amount=+5 μm].

In a case where the imaging mode is the wide-angle imaging mode (the signal reading range is the region ARc), the focusing position is set at the position PS as described above. Therefore, in the wide-angle imaging mode, the distance correction amount when the focusing position is set at the position PS is indicated. For instance, in a case where the temperature of the imaging lens is 20 degrees, focusing at the position PS which is the focusing position is ensured, by adjusting the distance between the imaging lens 21 and the imaging surface of the imaging element 411 by [distance correction amount=+20 μm]. Besides, in a case where the temperature of the imaging lens 21 is 30 degrees, focusing at the position PS which is the focusing position is ensured, by adjusting the distance between the imaging lens 21 and the imaging surface of the imaging element 411 by [distance correction amount=+30 μm].

In addition, also in a case where the imaging mode is the normal imaging mode (the signal reading range is the region ARb), like in the wide-angle imaging mode, focusing at the focusing position is ensured by performing adjustment of an error correction amount.

Incidentally, the correction table depicted in FIG. 5 is a correction table in which a case where the temperature of the imaging lens 21 is 20 degrees and the signal reading range is the region ARa of the telephoto mode is set as a reference. Therefore, the control section 52 sets the difference between an error correction amount corresponding to the temperature of the imaging lens and the signal reading range at the time of focusing and an error correction amount corresponding to the temperature of the imaging lens and the signal reading range at the current time, as a focal point change correction amount for the distance from the imaging lens to the imaging surface at the time of focusing. The focal point change correction amount is set in this way, so that focusing at the focusing position can be continued even upon a temperature change of the imaging lens or a modification of the signal reading range, and it is possible to acquire a picked-up image restrained from being lowered in resolution.

The correction table is preliminarily generated according to lens characteristics of the imaging lens 21, and is stored in the control section 52 or the like. In addition, in a case where the imaging lens 21 is interchangeable, correction tables may be preliminarily provided on the basis of the interchangeable imaging lenses, and the control section 52 may use the correction table corresponding to the identification information indicated by the lens information acquired from the imaging lens 21. Besides, correction tables for each of field curvature characteristic divisions may be preliminarily provided, and the control section 52 may use the correction table corresponding to the field curvature characteristic division indicated by the lens information acquired from the imaging lens 21. Further, on the basis of the field curvature characteristic indicated by the lens information acquired from the imaging lens 21, the control section 52 may perform calculation of a position PS at which the difference in resolution within the imaging surface is equal to or less than a predetermined value, and calculation of a distance correction amount according to the imaging mode and the temperature of the imaging lens 21.

<3. Operation of Imaging Device>

Figure 6:
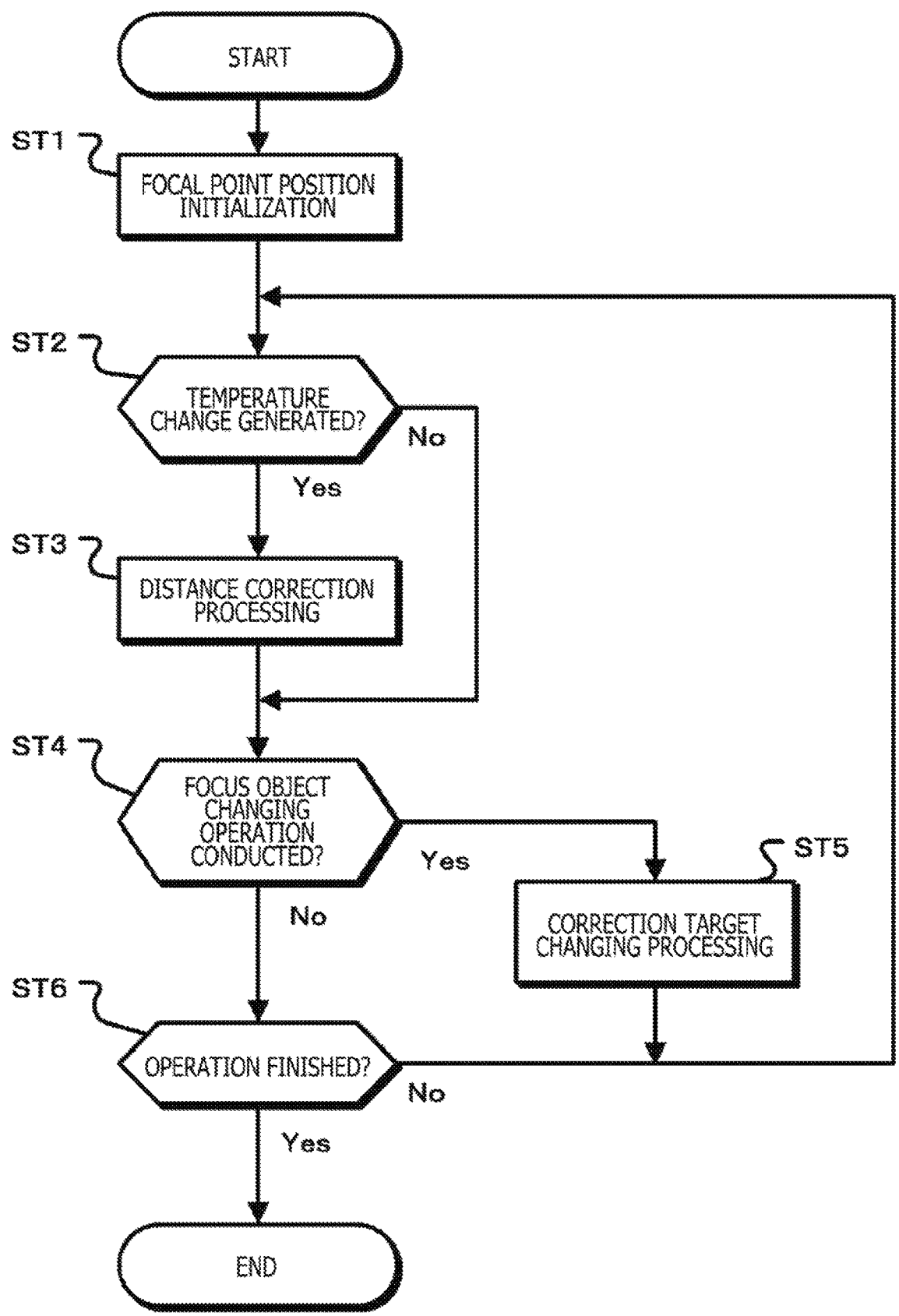
FIG. 6 is a flowchart illustrating an operation of the imaging device.

An operation of the imaging device will be next described. FIG. 6 is a flowchart illustrating an operation of the imaging device. When the operation of the imaging device is started, the control section 52 performs focal point position initialization in step ST1. The control section 52 generates a control signal on the basis of an operation signal from the user interface section 51, for example, and supplies the control signal to the distance adjustment section 30, to adjust the distance from the imaging lens 21 to the imaging surface of the imaging element 411. Thereafter, when the picked-up image reaches a desired resolution and the user's operation is stopped, the operation of the distance adjustment section 30 is stopped, whereby the distance from the imaging lens 21 to the imaging surface of the imaging element 411 is made to be a distance at which a picked-up image of a desired resolution can be obtained. Note that, in a case where the distance from the imaging lens 21 to the imaging surface of the imaging element 411 can be adjusted by a manual operation, the user may perform a manual operation such that a picked-up image of a desired resolution can be obtained. In addition, the control section 52 stores the temperature of the imaging lens and the signal reading range at the time when the focal point position initialization is conducted. When the focal point position initialization is completed, the control section 52 proceeds to step ST2. Note that the completion of the focal point position initialization may be instructed by the user; for example, it may be judged that the focal point position initialization is completed when a predetermined time has passed from the start of the operation of the imaging device or in a case where the period in which the user's operation is not performed has exceeded a predetermined time.

In step ST2, the control section 52 determines whether a temperature change has occurred. The control section 52 determines whether a temperature change has occurred, from the current temperature of the imaging lens 21 and the temperature at the time of focal point position initialization (initialization-time temperature). In a case where a temperature change such that the temperature difference between the current temperature and the initialization-time temperature exceeds a predetermined amount (for example, the temperature interval in the correction table) has occurred, the control section 52 proceeds to step ST3; in a case where a temperature change such that the temperature difference exceeds the predetermined amount has not occurred, the control section 52 proceeds to step ST4.

In step ST3, the control section performs distance correction processing. Since a temperature change such that the temperature difference exceeds the predetermined amount has occurred, the control section 52 sets a focal point change correction amount by using the correction table corresponding to the signal reading range at the time of focal point position initialization. Specifically, the control section 52 acquires a distance correction amount corresponding to the initialization-time temperature and a distance correction amount corresponding to the current temperature, which are indicated in the correction table corresponding to the signal reading range. Further, the control section 52 sets a correction amount necessary for converting the distance correction amount corresponding to the initialization-time temperature into the distance correction amount corresponding to the current temperature, as a focal point change correction amount in distance correction processing. The control section 52 generates a control signal on the basis of the focal point change correction amount thus set, and outputs the control signal to the distance adjustment section 30, thereby adjusting the distance from the imaging lens 21 to the imaging surface of the imaging element 411 by the focal point change correction amount, and then proceeds to step ST4.

In step ST4, the control section 52 determines whether a focus object changing operation has been conducted. The control section 52 determines that the focus object changing operation has been performed in a case where an operation signal for changing the distance from the imaging lens 21 to the imaging surface of the imaging element 411 is supplied from the user interface section 51 in order to focus on a new subject. In addition, the control section 52 may determine that the focus object changing operation has been conducted, in a case where it is determined, on the basis of the distance information from the distance adjustment section 30, that a manual operation for changing the distance from the imaging lens 21 to the imaging surface of the imaging element 411 has been performed. In a case where it is determined that the focus object changing operation has been conducted, the control section 52 proceeds to step ST5; in a case where it is determined that the focus object changing operation has not been conducted, the control section 52 proceeds to step ST6.

In step ST5, the control section performs correction target changing processing. Since the distance from the imaging lens 21 to the imaging surface of the imaging element 411 has been changed by the focus object changing operation, the control section 52 deems the new subject focused on as a correction target. In addition, the control section 52 stores the temperature of the imaging lens 21 and the signal reading range at the time when the focus object changing operation has been made or an error correction amount corresponding to the temperature of the imaging lens 21 and the signal reading range at the time when the focus object changing operation has been made, and returns to step ST2.

In step ST6, the control section determines whether the operation is finished. In a case where a power source turning off operation or the like for finishing the operation of the imaging device 10 has not been conducted, the control section 52 returns to step ST2; in a case where the power source turning off operation or the like for finishing the operation of the imaging device 10 has been conducted, the control section 52 finishes the operation of the imaging device.

Thus, according to the present technology, the focal point change correction amount is set according to the temperature of the imaging lens 21 and the signal reading range. Therefore, by adjusting the distance from the imaging lens 21 to the imaging surface of the imaging element 411 on the basis of the focal point change correction amount thus set, a moving image restrained from being lowered in resolution can be obtained even when the focal distance and/or field curvature of the imaging lens 21 is varied according to a temperature.

For example, in a case of picking up a moving image in a desired range, if an auto-focusing operation is performed, a subject coming into an imaging range, for example, is automatically focused on, so that the image of the region of the subject having been focused on before the subject comes into the imaging range would become an image lowered in resolution. In view of this, picking-up of a moving image is performed by fixing the focus in a desired range. In such a case, according to the present technology, the focal point change correction amount is set according to the temperature of the imaging lens and the signal reading range, even when the temperature of the imaging lens is varied due to heat generation by the imaging device itself, environmental temperature change, or the like. Further, since the distance from the imaging lens to the imaging surface of the imaging device is adjusted on the basis of the set focal point change correction amount, it is possible to obtain a moving image restrained from being lowered in resolution even upon temperature change.

In addition, while a case where the signal reading range is fixed has been described in the flowchart of FIG. 6, in a case where switching of the signal reading range is conducted, the focal point change correction amount need only be set using the correction tables corresponding to the signal reading ranges before and after the switching. Specifically, the control section 52 acquires a distance correction amount corresponding to the temperature of the imaging lens 21 at the time of switching of the signal reading range, from each of the correction table corresponding to the signal reading range before the switching and the correction table corresponding to the signal reading range after the switching. Further, the control section 52 sets a correction amount necessary for converting the distance correction amount before the switching into the distance correction amount after the switching, as a focal point change correction amount in distance correction processing. Furthermore, the control section 52 generates a control signal on the basis of the thus set focal point change correction amount, and outputs the control signal to the distance adjustment section 30, to adjust the distance from the imaging lens 21 to the imaging surface of the imaging element 411 by the set distance correction amount. By these operations, it is possible to acquire a picked-up image restrained from being lowered in resolution even upon a change of the imaging mode.

Besides, according to the present technology, even where a plastic lens which is more inexpensive and greater in variation of a lens characteristic due to temperature change or in dispersion of the lens characteristic variation as compared to a glass lens is used, it is possible to obtain a picked-up image restrained from being lowered in resolution irrespectively of temperature change or the like, and, therefore, the yield of the imaging leans can be improved.

<4. Other Operation of Imaging Device>

Incidentally, while a case where the signal reading range is set such that a central portion of the signal reading range is located at an optical axis position of the imaging lens has been illustrated in the aforementioned operation, the signal reading range may also be set such that the optical axis position of the imaging lens is not present at the central portion.

Figures 7A, 7B:
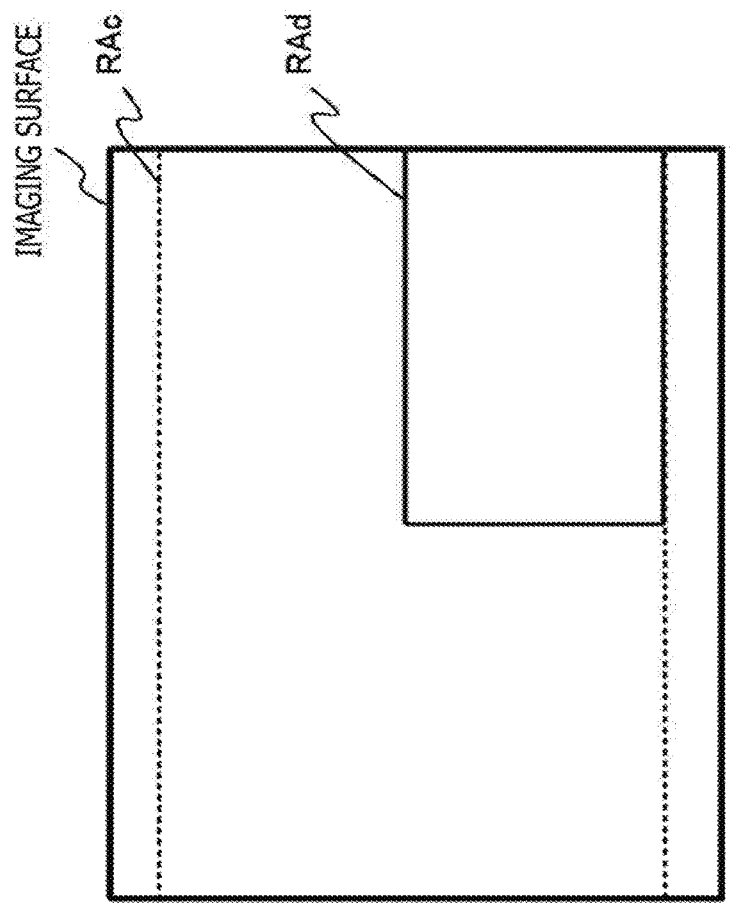
FIGS. 7A and 7B are diagrams illustrating a case where an optical axis position of the imaging lens is not present at a central portion of the signal reading range.

FIGS. 7A and 7B illustrate a case where the optical axis position of the imaging lens is not present at a central portion of the signal reading range. For example, the imaging mode at focal point position initialization is made to be the wide-angle imaging mode, and the distance from the imaging lens 21 to the imaging surface of the imaging element 411 is made to be a distance at which a picked-up image of a desired resolution can be obtained. Thereafter, in a case where a partial region ARd within the signal reading range in the wide-angle imaging mode is made to be a new signal reading range (a partial imaging mode), as depicted in FIG. 7A, a correction table corresponding to the region ARd which is the new signal reading range is used, as depicted in FIG. 7B. In addition, the control section 52 acquires a distance correction amount at the initialization-time temperature from the correction table corresponding to the signal reading range before switching, acquires a distance correction amount at the current temperature from the correction table corresponding to the signal reading range after the switching, and sets a focal point change amount. Further, the control section 52 generates a control signal on the basis of the thus set focal point change correction amount, and outputs the control signal to the distance adjustment section 30, to adjust the distance from the imaging lens 21 to the imaging surface of the imaging element 411 at the time of focusing.

Here, in the correction table corresponding to the new signal reading range, distance correction amounts for the focusing position in which the difference in resolution within the picked-up image after switching becomes equal to or less than a predetermined amount are provided according to the temperature of the imaging lens 21. As a result, even in a case where the signal reading range is changed and a picked-up image in which part of a picked-up image obtained in the wide-angle imaging mode is enlarged is to be acquired, it is possible to obtain a picked-up image restrained from being lowered in resolution, irrespectively of temperature change of the imaging lens or a change of the signal reading range.

In addition, in a case where the imaging lens section 20 is interchangeable, the control section 52 sets a focal point change correction amount using the correction table based on the lens information stored in the lens information storage section 23 of the imaging lens section 20. As a result, even when the lens is interchanged to an imaging lens having a small F value with which influence of out-of-focus is liable to occur on a picked-up image, or even when the lens is interchanged to an imaging lens in which lens characteristic variation due to temperature change or dispersion of lens characteristic variation is great, it is possible to obtain a picked-up image restrained from being lowered in resolution.

Note that, while the aforementioned imaging lens section 20 has had a configuration including the imaging lens 21 and the temperature detection section 22, a configuration may be adopted in which a focus lens or a zoom lens or the like is provided and the focus lens or the zoom lens is driven on the basis of a control signal from the main body section 40. In a case of such a configuration, it is sufficient if the control section 52 drives the focus lens according to the focal point change correction amount which is set.

A series of processings described herein can be carried out by hardware or software or a combined configuration of both of them. In a case where the processings are carried out by software, a program in which a processing sequence is recorded is installed in a memory in a computer incorporated in dedicated hardware, and executed. Alternatively, a program may be installed in a general-purpose computer capable of executing various processings, and may be executed.

For example, the program can be preliminarily stored in a hard disc, an SSD (Solid State Drive), or a ROM (Read Only Memory) as a recording medium. Alternatively, the program may be temporarily or permanently stored (recorded) in a removable recording medium such as a flexible disc, a CD-ROM (Compact Disc Read Only Memory), an MO (Magneto optical) disc, DVD (Digital Versatile Disc), BD (Blu-Ray Disc (registered trademark)), a magnetic disc, and a semiconductor memory card. Such a removable recording medium can be provided as so-called package software.

In addition, the program may not only be installed from a removable recording medium into a computer, but also may be transferred from a download site into a computer wirelessly or in a wired manner through a network such as a LAN (Local Area Network) or the Internet. The computer can receive the program transferred in such a manner, and can install the program in a recording medium such as a hard disc incorporated therein.

Note that the effects described herein are merely illustrative and are not limitative, and additional effects which are not described herein may exist. Besides, the present technology is not to be construed as limited to the above technological embodiment. The embodiment of this technology discloses the present technology in the form of illustration, and it is obvious that those skilled in the art can make modifications or substitutions of the embodiment without departing from the gist of the present technology. More specifically, in order to judge the gist of the present technology, the claims should be taken into consideration.

In addition, the focus control device of the present technology can also take the following configurations.

(1) A focus control device including:
a control section controlling a focal point change correction amount for a distance from an imaging lens to an imaging surface, on the basis of temperature change of the imaging lens and an imaging surface range in which a subject optical image is formed by the imaging lens.

(2) The focus control device as described in the above paragraph (1),
in which the control section sets a difference between a focal distance at a temperature of the imaging lens and in the imaging surface range at a focusing time and a focal distance at a temperature of the imaging lens and in the imaging surface range at a current time, as the focal point change correction amount.

(3) The focus control device as described in the above paragraph (2),
in which, in a case where a distance from a center to an end portion of the imaging surface range is greater than a predetermined distance, the focal point change correction amount is set by using a position at which a difference in resolution within the imaging surface range is equal to or less than a predetermined amount as a focusing position.

(4) The focus control device as described in the above paragraph (2) or (3),
in which, in a case where a distance from a center to an end portion of the imaging surface range is equal to or less than a predetermined distance, the focal point change correction amount is set by using the center of the imaging surface range as a focusing position.

(5) The focus control device as described in any one of the above paragraphs (2) to (4),
in which, in a case where an optical axis position of the imaging lens is not present at a central portion of the imaging surface range, the focal point change correction amount is set by using a position at which a difference in resolution within the imaging surface range is equal to or less than a predetermined amount as a focusing position.

(6) The focus control device as described in any one of the above paragraphs (1) to (5),
in which the control section preliminarily stores correction tables, each of the correction tables indicating a difference between a reference focal distance and a focal distance at a temperature of the imaging lens as a distance correction amount on an imaging surface range basis, the reference focal distance being a focal distance for a focusing position when the imaging lens is a predetermined temperature in a predetermined imaging surface range, and sets the focal point change correction amount by using the correction table corresponding to the imaging surface region.

(7) The focus control device as described in the above paragraph (6),
in which the control section acquires lens information from the imaging lens, and sets the focal point change correction amount by using the correction table according to the lens information.

(8) The focus control device as described in the above paragraph (7),
in which the control section sets the focal point change correction amount by using the correction table corresponding to identification information indicated by the lens information.

(9) The focus control device as described in the above paragraph (7),
in which the control section sets the focal point change correction amount by using the correction table corresponding to a field curvature characteristic division indicated by the lens information.

(10) The focus control device as described in any one of the above paragraphs (1) to (9),
in which the control section sets the imaging surface range according to an imaging mode.

INDUSTRIAL APPLICABILITY

In the focus control device, the focus control method, the program, and the imaging device of the present technology, the focal point change correction amount for the distance from the imaging lens to the imaging surface is set on the basis of temperature change of the imaging lens and the imaging surface range in which the subject optical image is formed by the imaging lens. Therefore, by adjusting the distance from the imaging lens to the imaging surface at the focusing time on the basis of the focal point change correction amount, it is possible to obtain a picked-up image having good resolution irrespectively of temperature change or the like. Accordingly, the present technology is suitable, for example, for an apparatus that picks up a moving image in a desired imaging mode by fixing a focal point position.

REFERENCE SIGN LIST

10 . . . Imaging device
20 . . . Imaging lens section
21 . . . Imaging lens
22 . . . Temperature detection section
23 . . . Lens information storage section
30 . . . Distance adjustment section
31 . . . Distance adjusting mechanism
32 . . . Mechanism driving section
40 . . . Main body section
41 . . . Imaging section
42 . . . Image signal processing section
43 . . . Display section
44 . . . Recording section
45 . . . Signal output section
51 . . . User interface section 52 . . . Control section
411 . . . Imaging element
412 . . . Element driving section

The invention claimed is:
1. A focus control device, comprising:
a control section configured to:
set a focal point change correction amount for a distance from an imaging lens to an imaging surface, wherein
the focal point change correction amount is controlled based on a temperature change of the imaging lens and an imaging surface range,
the imaging surface range is a range in which a subject optical image is formed by the imaging lens, and
when a distance from a center of the imaging surface range to an end portion of the imaging surface range equal to or less than a specific distance, the focal point change correction amount is set by using the center of the imaging surface range as a focusing position.
2. The focus control device according to claim 1, wherein the control section is further configured to set a difference between a reference focal distance and a specific focal distance as the focal point change correction amount, wherein
the reference focal distance is a focal distance at a focusing time when the imaging lens is at a first temperature and is in a first imaging surface range, and
the specific focal distance is a focal distance at a current time when the imaging lens is at a second temperature and is in a second imaging surface range.
3. The focus control device according to claim 2, wherein, when the distance from the center to the end portion of the imaging surface range greater than the specific distance, the control section is further configured to set the focal point change correction amount by using a position at which a difference in resolution within the imaging surface range is equal to or less than a specific amount as the focusing position.
4. The focus control device according to claim 2, wherein, based on absence of an optical axis position of the imaging lens at a central portion of the imaging surface range, the control section is further configured to set the focal point change correction amount by using a position at which a difference in resolution within the imaging surface range is equal to or less than a specific amount as the focusing position.
5. The focus control device according to claim 1, wherein the control section preliminarily stores plurality of correction tables,
each of the plurality of correction tables indicating a difference between a reference focal distance and a specific focal distance at a temperature of the imaging lens as a distance correction amount on an imaging surface range basis,
the reference focal distance is a focal distance for a focusing position when the imaging lens is a specific temperature in a specific imaging surface range, and
the control section is further configured to set the focal point change correction amount by using a first correction table of the plurality of correction tables corresponding to the imaging surface range.
6. The focus control device according to claim 5, wherein the control section is further configured to:

acquire lens information from the imaging lens; and
set the focal point change correction amount by using a second correction table, of the plurality of correction tables, according to the lens information.
7. The focus control device according to claim 6, wherein the control section is further configured to set the focal point change correction amount by using the second correction table corresponding to identification information indicated by the lens information.
8. The focus control device according to claim 6, wherein the control section is further configured to set the focal point change correction amount by using the second correction table corresponding to a field curvature characteristic division indicated by the lens information.
9. The focus control device according to claim 1, wherein the control section is further configured to set the imaging surface range according to an imaging mode.
10. A focus control method, comprising:
acquiring temperature of an imaging lens; and
setting a focal point change correction amount for a distance from the imaging lens to an imaging surface, wherein
the focal point change correction amount is controlled based on temperature change of the imaging lens and an imaging surface range,
the imaging surface range is a range in which a subject optical image is formed by the imaging lens, and
when a distance from a center of the imaging surface range to an end portion of the imaging surface range equal to or less than a specific distance, the focal point change correction amount is set by using the center of the imaging surface range as a focusing position.
11. A non-transitory computer-readable medium having stored thereon, computer-executable instructions which, when executed by a processor, cause the processor to execute operations, the operations comprising:
acquiring temperature of an imaging lens from a temperature detection section; and
setting a focal point change correction amount for a distance from the imaging lens to an imaging surface, wherein
the focal point change correction amount is controlled based on temperature change of the imaging lens and an imaging surface range,
the imaging surface range is a range in which a subject optical image is formed by the imaging lens, and
when a distance from a center of the imaging surface range to an end portion of the imaging surface range equal to or less than a specific distance, the focal point change correction amount is set by using the center of the imaging surface range as a focusing position.
12. An imaging device, comprising:
a temperature detection section configured to detect temperature of an imaging lens;
a control section configured to:
setting a focal point change correction amount for a distance from the imaging lens to an imaging surface, wherein
the focal point change correction amount is controlled based on temperature change of the imaging lens and an imaging surface range,
the imaging surface range is a range in which a subject optical image is formed by the imaging lens, and
when a distance from a center of the imaging surface range to an end portion of the imaging surface range equal to or less than a specific distance, the focal point change correction amount is set by using the center of the imaging surface range as a focusing position; and a distance adjustment section configured to perform distance adjustment of the focal point change correction amount set by the control section on the distance from the imaging lens to the imaging surface.

13. The imaging device according to claim 12, wherein the imaging lens has lens information when the imaging lens includes an interchangeable lens, and the control section is further configured to set the focal point change correction amount by using the lens information regarding the imaging lens to be used.

\* \* \* \* \*